Jan. 3, 1967   E. G. LA FONTAINE   3,296,591
PROTECTION DEVICE FOR PROTECTING VEHICLES AGAINST THEFT
Filed Dec. 10, 1963
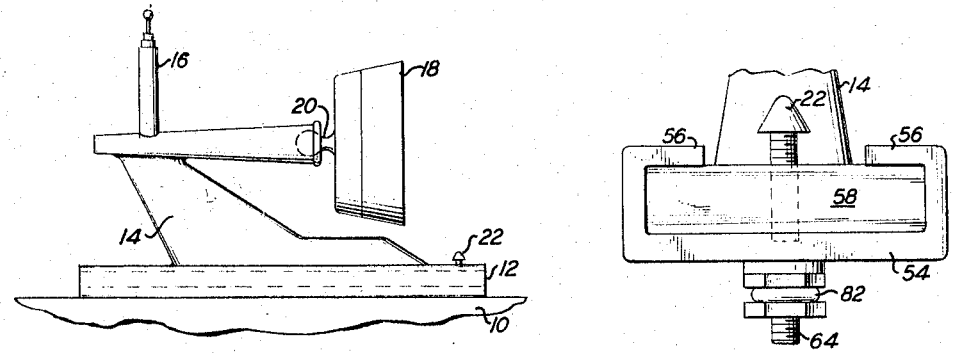
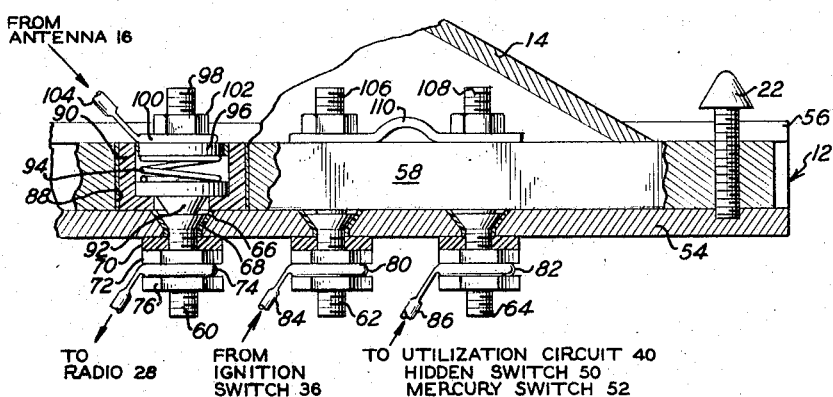
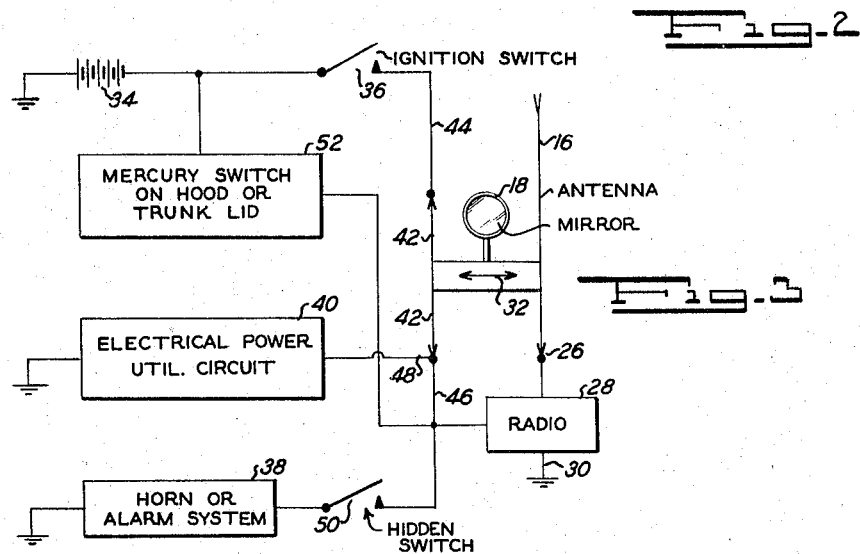

United States Patent Office 3,296,591
Patented Jan. 3, 1967

3,296,591
PROTECTION DEVICE FOR PROTECTING
VEHICLES AGAINST THEFT
Edward George La Fontaine, 245 W. 25th St.,
New York, N.Y. 10001
Filed Dec. 10, 1963, Ser. No. 329,508
6 Claims. (Cl. 340—64)

This invention relates to security apparatus and more particularly to mirror and/or antenna assemblies particularly suitable for use with devices having internally accommodated radios and the like which require external antennas. The invention is especially applicable to automobiles and similar vehicles employing auxiliary devices such as side-view mirrors.

The high incidence of damage and theft which occurs with respect to parked vehicles leads to a principal object of the invention which is to provide for the detaching of automobile accessories so that they can be stored for protection against theft and damage.

To achieve the above objective of the invention there is contemplated the provision of an adaptor on the body of an automobile or the like in a suitable position thereon such as on the fender or in the position whereat the sideview mirror is normally positioned. Said adaptor is provided to accommodate the detachable mounting thereon of the base of a support, to which may also be affixed an antenna of usual construction. Thus both the mirror and the antenna can simultaneously be detached from the vehicle when it is parked in an unguarded area.

According to a further feature of the invention, the detachable assembly may further be provided in such a manner as to act as a switch between the ignition switch of the associated vehicle and the electrical power utilization circuits associated therewith. Thus, for example, when the detachable assembly is removed from the automobile, the circuit between the ignition switch and said utilization circuit or circuits is opened and it is impossible to operate the vehicle.

In accordance with still a further feature of the invention, it is contemplated that another switch be associated with the removable assembly, this switch operating to couple the aforesaid ignition switch to the horn or burglar alarm system of the vehicle in such a manner that when the removable assembly is positioned on the vehicle and an attempt is made to operate the vehicle by unauthorized personnel, the horn will be sounded or the alarm system operated as a warning.

In accordance with still a further feature of the invention there is contemplated the use of a positionally responsive switch, such as a mercury or spring-operated switch, in association with the hood or trunk lid of the vehicle such that when the hood or the trunk lid is operated by unauthorized personnel, the horn is sounded as aforesaid.

The switch which has been mentioned above as being positioned between the horn or alarm system and the ignition switch is preferably mounted, according to the invention, in a concealed position in the vehicle known only to the owner of the vehicle and persons authorized by the owner to have knowledge thereof.

According to still a further feature of the invention, a locking means is provided for connecting the aforesaid antenna and mirror support to the associated adaptor, said locking means being provided in close proximity to the mirror so that the operator of the vehicle may manipulate both the locking means and the mirror from his position behind the wheel of the vehicle which he is operating.

Advantageously, the various features of the invention which have been noted above, may be incorporated into a single unit in the form of a mounting bracket and accessory assembly with which will be associated a harness incorporating the electrical conductors and switches necessary to effect the foregoing objectives and features.

According to a further advantage of the invention, the provisions thereof may be employed during manufacture of the vehicle itself, or alternatively, structures of the invention may be applied to vehicles which are already in use.

Other objects and features, as well as advantages of the invention will become apparent from the following detailed description of a preferred embodiment of the invention as illustrated in the accompanying drawing in which:

FIGURE 1 is a pictorial view illustrating a detachable antenna and mirror assembly provided in accordance with the invention and shown mounted on the fender of an automobile;

FIGURE 2 illustrates partially in cross-sectional view the adaptor and support employed in the detachable assembly of the invention, this view illustrating how electrical connections are effected with respect to the various circuits;

FIG. 3 is a wiring diagram illustrating the various features of the invention and particularly showing how the antenna may be coupled to an associated radio; and FIGURE 4 is an end view of the apparatus illustrated in FIG. 2.

In FIG. 1 is illustrated the fender 10 which constitutes part of the metal body of an automobile upon which the assembly of the invention is to be mounted. On the fender 10 is provided an adaptor or base 12 which will accommodate the mirror and antenna support 14, the details of which will be described hereinafter. Accommodated on the support 14 are an antenna 16 and a mirror 18, the mirror 18 being coupled to the support 14 by means of a ball and socket joint 20 of conventional construction. The support 14 is temporarily and conveniently coupled to the adaptor 12 by a locking means 22.

An automobile of conventional construction will generally comprise a battery 34 and an ignition switch 36. In accordance with the invention, it will also have a horn or alarm system 38. It will, moreover, conventionally comprise electrical power utilization circuits such as indicated at 40, which may take the form of ignition circuits, electrically operated fuel pumps and the like. Said automobile will further generally comprise an access with a closure such as a pivotable hood member (not shown) and an openable trunk lid (not shown) with which will be further associated an additional feature of the invention, as will also be hereinafter described.

Apparatus of the invention will further comprise an electrical conductor or bridge 42 which effects a connection between line 44 and line 46 and line 48. When the detachable assembly is in position, it will be possible to couple electrical power utilization circuit 40 to the battery 34 upon a closing of the ignition switch 36. The vehicle may thus be operated. However, should the removable assembly not be in position, a closing of ignition switch 36 will have no effect on the circuit 40 and thus the vehicle may not be operated.

In addition to the aforesaid apparatus, there is further contemplated the provision of a hidden switch 50 which may take the form of a conventional microswitch or the like, which will be positioned in a concealed zone, such as underneath the driver's seat or underneath the dashboard. Switch 50 is coupled to line 46 and is also coupled to the horn or alarm system 38. When the vehicle is left in unguarded condition, the switch 50 will normally be closed.

This means that should an unauthorized person attach the removable assembly so as to enable connecting the battery 34 via igintion switch 36 to line 46, the horn 38 will be operated as a warning signal. Only an operation of the hidden switch 50 to open the same will cause the horn 38 to be deactivated, unless the horn 38 is otherwise damaged or interfered with.

In addition to the aforesaid features of the invention, there is also contemplated the provision of a positionally responsive switch such as mercury switch 52 which is positioned on the aforementioned hood or trunk lid, said switch 52 is connected between the battery 34 and the switch 50 which is coupled to the horn or alarm system 38 in such a manner that when the hood or trunk lid is opened by unauthorized personnel with the switch 50 closed, the horn or alarm system 38 will again be operated as a warning. The operation of horn or alarm system 38 can once again be interrupted only by the opening of switch 50, which, of course, is concealed so as to be accessible only to those authorized to have knowledge of its location.

The various features of the invention described above may be incorporated into a single unit and harness, thereby facilitating manufacture, mounting and sale of the same. The details of this unit appear in FIG. 2, which is a partially sectional view of the aforesaid adaptor and support, an end view of which appears in FIG. 4.

In FIG. 2 appear the adaptor or base 12 and the support 14 referred to previously with respect to FIG. 1. Locking means 22 previously referred to also appears in FIG. 2. Said adaptor 12 comprises a bottom 54 (see also FIG. 4) and spaced opposed top sections 56 which function to define with the bottom 54 a slideway within which is accommodated the base 58 of support 14. Said base 58 is removably accommodated in the slideway to provide for ready detachment of the antenna and mirror assembly. Locking means 22 extends through the base 58 and is accommodated in a threaded opening in the bottom 54 to provide for locking the support to the adaptor in a manner whereby the same may be readily detached. Connected to the bottom 54 of the adaptor are three threaded posts 60, 62 and 64, constituting respectively electrical conductors.

The details of the connection of threaded post 60 are shown in FIG. 3 wherein it appears that the bottom 54 is provided with a bore or hole 66 having a flared upper portion, the threaded post 60 having a conical head conforming in shape to the flared top of the hole 66.

It is also seen that between the bottom 54, which may preferably be of metal, and the threaded post 60 which is also of metal, is an electrically insulative insert 68 conforming to the shape of the hole 66 and providing a physical support for threaded post 60 and for insulating the same from the bottom 54.

Said post 60 extends below the bottom 54 and through a hole in the fender (not shown in FIG. 2), there being mounted on the post a washer 70 of an electrically insulative material, the washer being sandwiched against the bottom 54 by a nut 72, whereby the threaded post is fixed in position.

A lug 74 provides for electrical connection to the post 60, a second nut 76 sandwiching said lug against the first said nut 72. A wire 78 is connected to the lug 74 in conventional manner, said wire leading to the radio as appears diagrammatically in FIG. 3 described above.

Similarly, to the above described details, electrical conductors or posts 62 and 64 are provided with lugs 80 and 82, respectively having connected thereto the wires 84 and 86, the wire 84 being connected to the ignition switch 36 of FIG. 2 and the wire 86 being connected to the utilization circuit 40, the hidden switch 50 and the mercury switch 52, also in FIG. 3.

It will be noted in FIG. 2 that the heads of the posts 60 are slightly recessed within the associated hole so as not to interfere with the sliding movement of the base 58, which is in turn provided with resiliently loaded electrical contacts, as will next be described with respect to, for example, threaded post 60.

More particularly, base 58 is provided with a hole or bore 88, within which is provided an electrically insulative insert 90 having thereon a lower annular inwardly directed flange, the purpose of which will shortly become apparent. Said insulating insert 90 is affixed by an appropriate cement to the base 58 and accommodates therein the spring-loaded button or electrical contact 92, which is so shaped as to be slideable within the insert 90 while being limited in movement by the flange of the same. Said button 92 is normally urged downwardly by a spring 94, such that the button protrudes yieldably from the bottom of the base and is thus adapted to make contact with the head of the threaded post 60. The spring 94 acts upwardly against the head 96 on threaded post 98, said head being cemented to the insert 90 by a suitable cement. A lug 100 encircles the post 98 and is sandwiched against the head 96 by means of a nut 102, there being connected to the lug 100 a wire 104 in turn connected to the antenna 16.

From the above description it will now appear that the sliding of the base 58 of the support 14 serves not only to disconnect the antenna and mirror from their normal position of use on the exterior of the associated automobile but as well to provide for an electrical connection, for example, between the wire 78 leading to the radio 28, and a wire 104 leading from the antenna 16.

In a similar manner, threaded posts 106 and 108 are operatively associated with threaded posts 62 and 64, there being the difference that said posts 106 and 102, constituting electrical conductors, are connected to one another by means of an electrically conductive bridge 110, such that a proper positioning of base 58 in the slideway 12 will effect an electrical connection between threaded posts 62 and 64.

Since said posts 62 and 64 are connected to wires 84 and 86, this effects a connection from ignition switch 36 to utilization circuit 40, hidden switch 50 and mercury switch 52, as may be visualized in association with the circuit shown in FIG. 3.

From what has been stated above, it will now be appreciated that the invention contemplates, in combination with a means having an internally located electromagnetic transducer such as a radio or perhaps a television receiver, an antenna and a support fixed to the antenna and adapted for detachably engaging the aforesaid means and supporting the antenna externally thereof while effecting an electrical connection between the antenna and said transducer.

When the means is a mobile vehicle or the like employing a side-view mirror or some other such auxiliary device, said mirror may further be mounted on the support, the support, mirror and antenna being detachable as a unit from the vehicle for storage and protection against damage and theft.

In a situation where the automobile comprises a battery and an ignition switch coupled thereto, as well as a horn or alarm system, the combination of the invention may further comprise spaced electrical conductors on the aforesaid adaptor and coupled respectively to the ignition switch and horn or alarm system with bridging means being provided on the aforesaid base for connecting these conductors to effect an operation of the horn or alarm system, there being further contemplated the provision of a switch between the horn or alarm system and the associated one of the aforesaid conductors to provide for discontinuing the operation of the horn.

In association with vehicles such as automobiles having displaceable hood elements or trunk lids providing access at least in part to the interior of the automobile, there is contemplated in accordance with the invention as described above, a positionally responsive switch mounted on the displaceable element and coupled to the above-noted switch to effect an operation of the horn or alarm system when the displaceable element is moved by unauthorized personnel not having knowledge of the associated hidden switch.

Still further, it will now be appreciated that in an automobile comprising a battery, an ignition switch coupled to the battery and an electrical power utilization circuit adapted to be operated by the aforesaid battery, there may be further provided according to the invention electrical conductors mounted on the aforesaid adaptor and coupled respectively to the switch and circuit with bridging means being provided on the base to effect a connection of the conductors and thereby of the switch and electrical power utilization circuit.

The invention is also directed to the fact that the locking means provided for affixing the assembly to the automobile are arranged at the same end of the base 58 as is the mirror, so that both may be manipulated by the operator of the vehicle when in the driver's seat behind the steering wheel. Thus the detachable assembly may be put into position from the driver's seat, the locking means operated and the mirror adjusted in the most convenient manner possible.

There will now be obvious to those skilled in the art many modifications and variations of the structure set forth above. These modifications and variations will not depart from the scope of the invention if defined by the following claims.

What is claimed is:

1. In an automobile: apparatus comprising a battery, an ignition switch coupled to said battery, alarm means, electrical power utilization means, a support detachably mountable on said automobile, a first electrical conductor coupled to said ignition switch, a second electrical conductor spaced from the first conductor and coupled to said alarm and power utilization means, said support including bridging means adapted for connecting, with the support mounted on said automobile, said conductors to couple said power utilization and alarm means to said ignition switch, and a further switch concealed in said automobile and electrically coupled between said alarm means and the associated one of said conductors to provide for selective operation of said alarm means, said support comprising a side-view mirror, the support including the bridge means and the mirror being detachable as a unit for storage and protection against damage and theft and to disconnect the alarm and power utilization means from the ignition switch.

2. Apparatus as claimed in claim 1, comprising a radio in said automobile, an antenna on said support, and means on the support to connect said antenna to said radio.

3. A combination as claimed in claim 1, comprising a slideway on said automobile, said support being slidably accommodated in said slideway.

4. Apparatus as claimed in claim 3, wherein said automobile includes closure means providing access to the interior of said automobile, said apparatus further comprising a positionally responsive switch responsive to said closure means and coupled between said battery and said alarm means which is thus operable under the control of the latter said switch.

5. Apparatus as claimed in claim 4, wherein said support is a hollow element enclosing and shielding said conductors.

6. Apparatus as claimed in claim 5, comprising means for locking said support to said slideway.

References Cited by the Examiner

UNITED STATES PATENTS

| | | | |
|---|---|---|---|
| 2,607,837 | 8/1952 | Federuk | 340—63 |
| 2,780,797 | 2/1957 | Gooding | 340—52 |
| 2,799,843 | 7/1957 | Savino | 340—52 |
| 2,935,730 | 5/1960 | Procter | 340—63 |

NEIL C. READ, *Primary Examiner.*

A. H. WARING, *Assistant Examiner.*